United States Patent Office 3,041,309
Patented June 26, 1962

3,041,309
BLEND OF STYRENE COPOLYMER WITH A GRAFT-COPOLYMER OF AN ALKYL METHACRYLATE UPON AN ALKYL ACRYLATE POLYMER
Massimo Baer, Longmeadow, Mass., assignor to Monsanto Chemical Company, St. Louis, Mo., a corporation of Delaware
No Drawing. Filed Apr. 24, 1959, Ser. No. 808,566
8 Claims. (Cl. 260—45.5)

This invention relates to novel graft copolymers and to blends of said graft copolymers with other thermoplastic polymers.

It is an object of this invention to provide novel graft copolymers.

Another object of this invention is to provide blends of novel graft copolymers with other thermoplastic polymers.

Other objects and advantages of the invention will be apparent from the following detailed descriptions thereof.

A novel group of graft copolymers has been prepared by polymerizing 20–200 parts of an alkyl methacrylate monomer charge in an aqueous dispersion containing 100 parts of a rubbery acrylate ester polymer. A novel group of polymer blends has been prepared by admixing the above described graft copolymers with certain rigid styrene interpolymers, particularly styrene-acrylonitrile and styrene-methyl methacrylate interpolymers, in such proportions that the rubbery acrylate ester polymer substrate of the graft copolymer constitutes about 5–40% by weight of the polymer blend.

The following examples and descriptions are set forth to illustrate more clearly the principle and practice of this invention to those skilled in the art. Unless otherwise noted, where parts or quantities are mentioned, they are parts or quantities by weight.

ACRYLATE ESTER LATEXES A–K

A series of latexes of acrylate ester polymers are prepared employing the polymerization recipe set forth below.

Components: Parts
  Water _____ 300
  Monomers _____ 100
  Sodium lauryl sulfate_____ 3.0
  Potassium persulfate_____ 0.1

The water and sodium lauryl sulfate emulsifier are charged to a pressure-resistant, stirred autoclave and the resulting solution is boiled to remove dissolved oxygen. The emulsifier solution is cooled under nitrogen and the monomers and potassium persulfate are then added to the autoclave. The autoclave is next sealed and polymerization is effected by stirring the reaction mixture for 20 hours at a temperature of 50° C. The conversion of monomers to polymers is about 98%. The acrylate ester latex identification and the monomer charge employed in the preparation thereof are set forth in Table I.

Table I

| Acrylate Ester Latex Identification | Ethyl Acrylate | Monomer Charge | | Acrylonitrile |
|---|---|---|---|---|
| | | n-Butyl Acrylate | n-Octyl Acrylate | |
| A | | 100 | | |
| B | 25 | 75 | | |
| C | 50 | 50 | | |
| D | 75 | 25 | | |
| E | 90 | 10 | | |
| F | 90 | | 10 | |
| G | | 88 | | 12 |
| H | | 75 | 20 | 5 |
| I | | 50 | 44 | 6 |
| J | | 50 | 38 | 12 |
| K | | 50 | 32 | 18 |

GRAFT COPOLYMERS A–N

A series of graft copolymers are prepared by adding a methyl methacrylate monomer charge (containing 0.1% of dodecyl mercaptan as a modifier) to one of the above prepared acrylate ester latexes which contains 100 parts of the rubbery acrylate ester polymer. The reaction mixtures are stirred for 18 hours at 50° C. at the end of which time all of the added monomers have polymerized. Two percent of a styrenated phenol antioxidant and 0.2% of a polymerization short stop (both percentages being based on the acrylate ester polymer substrate) are added to each of the aqueous polymer dispersions. The acrylate ester latex employed, the quantity of methyl methacrylate monomer charge and the composition of the methyl methacrylate monomer charge are set forth in Table II.

Table II

| Graft Copolymer Identification | Acrylate Ester Substrate | Parts of Monomer Charge Employed | Composition of Monomer Charge | |
|---|---|---|---|---|
| | | | Methyl Methacrylate, percent | Acrylonitrile, percent |
| A | A | 80 | 100 | |
| B | A | 80 | 90 | 10 |
| C | A | 80 | 80 | 20 |
| D | B | 70 | 100 | |
| E | C | 60 | 100 | |
| F | C | 60 | 90 | 10 |
| G | D | 50 | 100 | |
| H | E | 50 | 100 | |
| I | F | 50 | 100 | |
| J | G | 80 | 100 | |
| K | H | 50 | 100 | |
| L | I | 50 | 100 | |
| M | J | 50 | 100 | |
| N | K | 50 | 100 | |

Aliquots of each of the above described graft copolymers are recovered from the latexes by drum drying and are stiff rubbers which exhibit excellent stability when exposed to ultraviolet light and/or ozone. The efficiency of the grafting reaction is high as approximately 80% of the charged methyl methacrylate or methyl methacrylate-acrylonitrile monomer mixture polymerizes upon and becomes chemically combined with the rubbery acrylate ester polymer substrate.

EXAMPLE I

*Part A.*—Fourteen polymer blends are prepared by admixing a latex of a styrene-acrylonitrile interpolymer with a latex of one of Graft Copolymers A through N and recovering the mixed polymers therefrom by drum drying. The styrene-acrylonitrile interpolymer consists of about 73% styrene and 27% acrylonitrile and has an intrinsic viscosity of about 0.5 as determined in dimethylformamide at 25° C. The proportions of resin solids employed in the preparation of each of the blends are such that the rubbery acrylate ester polymer substrate of the graft copolymer constitutes 30% by weight of the blend. The composition of the blends is set forth in Table III.

Table III

| Blend No. | Graft Copolymer Included in Blend | Parts of Graft Copolymer | Parts of Styrene-Acrylonitrile |
|---|---|---|---|
| 1 | A | 54 | 46 |
| 2 | B | 54 | 46 |
| 3 | C | 54 | 46 |
| 4 | D | 51 | 49 |
| 5 | E | 48 | 52 |
| 6 | F | 48 | 52 |
| 7 | G | 45 | 55 |
| 8 | H | 45 | 55 |
| 9 | I | 45 | 55 |
| 10 | J | 54 | 46 |
| 11 | K | 45 | 55 |
| 12 | L | 45 | 55 |
| 13 | M | 45 | 55 |
| 14 | N | 45 | 55 |

Injection molded samples of all of the above polymer blends have an Izod Impact Strength of greater than 1.0 ft.lb./inch of notch (measured with a notch having a radius of curvature of 0.01"), a Tensile Strength of greater than 4,500 p.s.i. and a Flexural Modulus of greater than $2.5 \times 10^5$ p.s.i. The polymer blends all show excellent stability when exposed to ultraviolet light and/or ozone.

*Part B.*—For purposes of comparison 11 control polymer blends are prepared by blending a latex containing 70 parts of the styrene-acrylonitrile interpolymer described in Part A above with a latex containing 30 parts of one of rubbery acrylate ester polymers A through K and recovering the mixed polymers therefrom by drum drying. It will be noted that these polymer blends are similar to the polymer blends in Part A above in that they contain 30% by weight of a rubbery acrylate ester polymer. Injection molded samples of all of these control polymer blends have an Izod Impact Strength of less than 0.5 ft.lb./inch of notch which is less than half the values obtained with the polymer blends of Part A above.

EXAMPLE II

Example I is repeated except that the styrene-acrylonitrile component is replaced with an interpolymer of about 73% styrene and 27% methyl methacrylate which has an intrinsic viscosity of about 0.5 as determined in dimethylformamide at 25° C. Comparable results are obtained.

The graft copolymers of the invention are prepared by polymerizing about 20–200 and preferably about 40–100 parts by weight of an alkyl methacrylate monomer charge in an aqueous dispersion containing 100 parts by weight of a rubbery acrylate ester polymer.

The alkyl methacrylate monomer charge employed in the preparation of the graft copolymer will consist of (a) about 50–100% by weight of at least one alkyl methacrylate in which the alkyl group contains 1–4 carbon atoms, (b) about 50–0% by weight of a nitrile monomer of the group consisting of acrylonitrile, methacrylonitrile and mixtures thereof, and (c) up to about 20% by weight of a vinylidene monomer other than a nitrile monomer which is interpolymerizable with the alkyl methacrylate, the sum of (a), (b) and (c) totaling 100%. Examples of typical vinylidene monomers which are interpolymerizable with an alkyl methacrylate and mixtures of an alkyl methacrylate and acrylonitrile or methacrylonitrile include vinyl chloride, vinylidene chloride, alkyl esters of acrylic acid in which the alkyl group contains 1–8 carbon atoms, and monovinylidene aromatic hydrocarbons such as styrene, ring-alkylstyrenes, alpha-alkylstyrenes, and the like.

To prepare the graft copolymers, the alkyl methacrylate monomer charge is added to the aqueous dispersion of the rubbery acrylate ester polymer and the resulting mixture is agitated and heated to a temperature at which the polymerization initiator present in the system initiates the polymerization of the added monomers. If desired, fresh polymerization initiator can be added to the polymerization system with the alkyl methacrylate monomer charge, although this further addition of polymerization initiator is usually not required. In most cases, the residual polymerization initiator employed in the polymerization of the rubbery acrylate ester polymer and/or the radicals present on the rubbery acrylate ester polymer chains are sufficient to initiate the polymerization of the added monomers. It is preferred not to add additional emulsifying agents to the polymerization system and by carrying out the polymerization in this manner substantially all of the added monomers become dispersed in the previously formed rubbery acrylate ester polymer particles and the efficiency of the grafting reaction is very high. If desired, small quantities of polymerization modifiers such as long-chain alkyl mercaptans may be added to the polymerization with the alkyl methacrylate monomer charge so as to regulate and control the molecular weight of the final graft copolymer.

The substrates of the graft copolymers are polymers of 80–100% by weight of an alkyl acrylate in which the alkyl group contains 2–18 carbon atoms and, correspondingly, 20–0% by weight of a vinylidene monomer interpolymerizable therewith. Although any alkyl acrylate monomer falling within the above description can be employed, it is preferred to employ alkyl acrylates in which the alkyl group contains 2–8 carbon atoms and particularly ethyl acrylate, butyl acrylate and mixtures thereof. Typical vinylidene monomers which can be interpolymerized in minor amounts with the alkyl acrylates include vinyl chloride, vinylidene chloride, acrylonitrile, methacrylonitrile, alkyl esters of methacrylic acid in which the alkyl group contains 1–8 carbon atoms, and the like. If desired, small quantities of up to about 1.5% of cross-linking monomers may be included in the alkyl acrylate polymers. Cross-linking monomers are monomers containing a plurality of terminal ethylenic groups which are not conjugated in the 1, 3 position. Examples of such cross-linking monomers include divinylbenzene, diallyl maleate, diallyl fumarate, diallyl phthalate, etc.

The aqueous dispersion of the rubbery acrylate ester polymer can be prepared in accordance with any of the usual aqueous emulsion polymerization procedures known in the art. In general, the monomers are emulsified in water with the aid of miscelle-forming emulsifying agents which are usually compounds containing hydrocarbon groups of 8–22 carbon atoms coupled to highly polar solubilizing groups such as alkali metal and ammonium carboxylate groups, sulfate half ester groups, sulfonate groups, phosphate partial ester groups and the like. Exemplary emulsifying agents include sodium oleate, sodium stearate, the sodium salts of sulfate half esters of fatty alcohols produced by reduction of the fatty acids of natural oils such as coconut oil, sodium abietate, sodium salts of sulfoscuccinic esters such as sodium dioctyl sulfoscuccinate, sodium salts of alkylated benzene and naphthalene sulfonates such as sodium dodecyl benzene sulfate, sodium salts of monosulfated fatty acid monoglycerides and the like. Such emulsifying agents normally will be employed in the ratio of about 2–7 parts per 100 parts of monomers. The polymerization medium will contain a suitable water-soluble, free radical generating polymerization initiator such as hydrogen peroxide, potassium or sodium persulfates, perborates, peracetates, percarbonates and the like, which polymerization initiators may be associated with activated systems such as redox systems involving versivalent metals and mild reducing agents. The polymerization medium also may contain a chain transfer agent such as a higher alkyl mercaptan of the order of dodecyl mercaptan. The polymerizations can be carried out at temperatures from about 40° C. to about 80° C. or, in the case of activated systems, at temperatures of 0° C. to 80° C.

The graft copolymers of the invention vary in physical nature from stiff rubbers to hard resins. They may be used per se in the manufacture of molded articles or may be employed as stiffening and reinforcing agents in rubber stocks, e.g., in high abrasion resistant shoe sole stocks. The graft copolymers also may be used in the manufacture of glass fiber reinforced thermoplastic laminates of the type described in U.S. 2,805,181. They also may be included in blends with hard rigid vinyl chloride polymers, e.g., polyvinyl chloride, to improve the impact strength thereof. Typically such blends will contain 80–95% by weight of the vinyl chloride polymer and, correspondingly, 20–5% by weight of the graft copolymer.

A prime utility of the graft copolymers lies in the preparation of blends with rigid styrene interpolymers. The graft copolymer and the rigid styrene interpolymer are admixed in such proportions that the rubbery acrylate ester polymer substrate of the graft copolymer constitutes about 5–40 or preferably 20–35% by weight of the polymer blend. Such blends can be employed in the manufacture of high strength moldings, in the manufacture of extruded sheets and in the manufacture of high strength articles by other methods well known to the art.

The rigid styrene interpolymers employed in the polymer blends consist of about 50–90% by weight of styrene, a ring-alkylstyrene, an alpha-alkylstyrene, an alpha-alkyl-, ring-alkylstyrene, or a mixture thereof and, correspondingly, about 50–10% by weight of acrylonitrile, methacrylonitrile, an alkyl methacrylate in which the alkyl group contains 1–4 carbon atoms, or a mixture thereof. Examples of the ring-alkylstyrenes, alpha-alkylstyrenes, and alpha-alkyl-, ring-alkylstyrenes which can be employed in the styrene interpolymers include o-, m-, and p-methylstyrenes, o-, m-, and p-ethylstyrenes, 2,4-dimethylstyrene, 2,4-diethylstyrene, 2-methyl-4-ethylstyrene, alpha-methylstyrene, alpha-ethylstyrene, alpha-methyl-2-methylstyrene, alpha-methyl-4-methylstyrene, alpha-methyl-2,4-dimethylstyrene and the like. Such rigid styrene interpolymers can be prepared by mass, solution, suspension or emulsion polymerization techniques by methods well known in the art, e.g., see "Styrene Its Polymers Copolymers and Derivatives" by Boundy and Boyer, Reinhold Publishing Company, Waverley Press, Baltimore, Maryland. Preferably, the rigid styrene interpolymers employed will have a molecular weight of at least about 30,000. In the preferred polymer blends, the monomer composition of the superstrate of the graft copolymer will be substantially identical with the monomer composition of the rigid styrene interpolymer.

The polymer blends can be prepared by blending latexes of the graft copolymer and the rigid styrene interpolymer and recovering the polymers from the mixed latexes. Alternatively, the polymer blends can be prepared by comalaxating a mixture of the rigid styrene interpolymer and the graft copolymer at an elevated temperature for a period of time sufficient to prepare an intimate fusion blend of the polymers.

An outstanding characteristic of both the graft copolymers per se and the blends of the graft copolymers with the rigid styrene interpolymers is that they have outstanding resistance to the deteriorative action of ultraviolet light and/or ozone. Accordingly, these compositions may be employed advantageously in the manufacture of fabricated plastic articles that are to be exposed to outdoor weathering conditions.

If desired, conventional compounding ingredients such as colorants, dyes, pigments, stabilizers, antioxidants, plasticizers and the like may be incorporated in either the graft copolymers per se or in blends of the graft copolymers with rigid styrene interpolymers.

The above descriptions and particularly the examples are set forth by way of illustration only. Many other variations and modifications of the invention will be apparent to those skilled in the art and can be employed without departing from the spirit and scope of the invention herein described.

What is claimed is:

1. An intimate fusion blend of (A) at least one rigid interpolymer of 50–90% by weight of a chemically-combined monovinylidene aromatic hydrocarbon of the group consisting of styrene, a ring-alkylstyrene, an alpha-alkylstyrene, an alpha-alkyl-ring-alkylstyrene, and mixtures thereof and 50–10% by weight of a chemically-combined acrylic compound of the group consisting of acrylonitrile, methacrylonitrile, and alkyl methacrylate wherein the alkyl radical contains 1–4 carbon atoms and mixtures thereof and (B) a graft copolymer prepared by polymerizing about 20–200 parts by weight of a monomer charge consisting of about 50–100% by weight of at least one alkyl methacrylate wherein the alkyl radical contains 1–4 carbon atoms, up to about 50% by weight of a monomer of the group consisting of acrylonitrile, methacrylonitrile, and mixtures thereof, and up to about 20% by weight of a different interpolymerizable monovinylidene monomer in an aqueous dispersion containing 100 parts by weight of a rubbery acrylate polymer which consists of 80–100% by weight of a chemically-combined alkyl acrylate wherein the alkyl radical contains 2–18 carbon atoms and up to 20% by weight of a chemically-combined interpolymerizable monovinylidene monomer; said components A and B being so proportioned that the rubbery acrylate polymer substrate of the graft copolymer constitutes about 5–40% by weight of the blend.

2. A polymer blend as in claim 1 wherein the rubbery acrylate polymer is polyethyl acrylate.

3. A polymer blend as in claim 1 wherein the rubbery acrylate polymer is polybutyl acrylate.

4. A polymer blend as in claim 1 wherein the rubbery acrylate polymer is a copolymer of about 25–75% by weight of ethyl acrylate and 75–25% by weight of butyl acrylate.

5. A polymer blend as in claim 1 in which the rigid interpolymer is an interpolymer of styrene and acrylonitrile.

6. A polymer blend as in claim 2 in which the rigid interpolymer is an interpolymer of styrene and acrylonitrile.

7. A polymer blend as in claim 3 in which the rigid interpolymer is an interpolymer of styrene and acrylonitrile.

8. A polymer blend as in claim 4 in which the rigid interpolymer is an interpolymer of styrene and acrylonitrile.

References Cited in the file of this patent

UNITED STATES PATENTS

| | | |
|---|---|---|
| 2,802,808 | Hayes | Aug. 13, 1957 |
| 2,840,447 | Green | June 24, 1958 |
| 2,848,750 | Sannecke | Aug. 26, 1958 |
| 2,958,673 | Jen | Nov. 1, 1960 |

FOREIGN PATENTS

| | | |
|---|---|---|
| 679,562 | Great Britain | Sept. 17, 1952 |